United States Patent
Wang et al.

(10) Patent No.: US 9,648,405 B2
(45) Date of Patent: May 9, 2017

(54) SPEAKER AND MOBILE COMMUNICATION TERMINAL DEVICE USING SAME

(71) Applicants: Chengliang Wang, Shenzhen (CN);
Fuhu Zhang, Shenzhen (CN)

(72) Inventors: Chengliang Wang, Shenzhen (CN);
Fuhu Zhang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 14/984,272

(22) Filed: Dec. 30, 2015

(65) Prior Publication Data
US 2016/0227007 A1    Aug. 4, 2016

(30) Foreign Application Priority Data
Jan. 29, 2015    (CN) .................... 2015 2 0065444 U

(51) Int. Cl.
*H04R 1/06*    (2006.01)
*H04R 3/00*    (2006.01)
*H04M 1/03*    (2006.01)

(52) U.S. Cl.
CPC ............... *H04R 1/06* (2013.01); *H04M 1/03* (2013.01); *H04R 3/007* (2013.01); *H04R 2499/11* (2013.01)

(58) Field of Classification Search
CPC .......... H04M 1/00; H04M 1/03; H04M 1/035; H04R 1/06; H04R 3/007; H04R 1/02; H04R 1/04; H04R 2499/11
See application file for complete search history.

(56) References Cited

U.S. PATENT DOCUMENTS

| | | | | |
|---|---|---|---|---|
| 4,868,876 A * | 9/1989 | Schiller | .................... | H05F 3/02 361/117 |
| 5,722,055 A * | 2/1998 | Kobayashi | ............ | H04M 1/026 455/128 |
| 5,788,516 A * | 8/1998 | Uggmark | ........... | H01R 13/2414 439/63 |
| 6,011,699 A * | 1/2000 | Murray | ................. | G06F 1/1616 361/814 |
| 6,477,356 B1 * | 11/2002 | Kitamura | ............... | H04R 1/025 381/335 |
| 7,583,986 B2 * | 9/2009 | Hyun | .................. | H01Q 1/1207 455/575.1 |
| 7,756,553 B2 * | 7/2010 | Dinh | ................... | H04M 1/0274 455/550.1 |

(Continued)

*Primary Examiner* — Joshua Kaufman
(74) *Attorney, Agent, or Firm* — Na Xu; IPro, PLLC

(57) ABSTRACT

A speaker is disclosed. The speaker including a first cover, a second cover forming a receiving space, a first steel strap assembled with the first cover, a second steel strap assembled with the second cover, a sounding element accommodated in the receiving space and located between the first strap and the second strap, and a flexible printed circuit board accommodated in the receiving space. The flexible printed circuit board includes a grounding pin, a positive pin and a negative pin for transmitting audio signal. The positive pin and the negative pin are electrically connected to the sounding element. The ground pin is respectively connected to the first steel strap, the second steel strap and the sounding element. The speaker is not only simple in structure, but also has low cost.

4 Claims, 3 Drawing Sheets

(56) References Cited

U.S. PATENT DOCUMENTS

| | | | | |
|---|---|---|---|---|
| 7,940,950 B2* | 5/2011 | Shim | H04R 9/02 | 381/189 |
| 8,023,681 B2* | 9/2011 | Wu | H04M 1/035 | 381/334 |
| 8,938,083 B2* | 1/2015 | Liang | H04R 1/025 | 181/199 |
| 9,167,324 B2* | 10/2015 | Yang | H04R 1/02 | |
| 2002/0172384 A1* | 11/2002 | Takeuchi | H04R 1/04 | 381/175 |
| 2004/0036656 A1* | 2/2004 | Nevermann | H01Q 1/243 | 343/702 |
| 2004/0253977 A1* | 12/2004 | Matsumoto | H04M 1/03 | 455/550.1 |
| 2005/0207610 A1* | 9/2005 | Kajiwara | B06B 1/045 | 381/396 |
| 2007/0081691 A1* | 4/2007 | Park | H04M 1/03 | 381/386 |
| 2008/0019502 A1* | 1/2008 | Emmert | H04M 1/026 | 379/433.07 |
| 2008/0094753 A1* | 4/2008 | Brodkin | H05K 1/147 | 360/234.5 |
| 2008/0144879 A1* | 6/2008 | Yang | H04M 1/03 | 381/386 |
| 2008/0219464 A1* | 9/2008 | Smith | A61B 7/04 | 381/67 |
| 2008/0316116 A1* | 12/2008 | Hobson | H01Q 1/243 | 343/702 |
| 2009/0169046 A1* | 7/2009 | Wu | H04R 1/028 | 381/394 |
| 2009/0185045 A1* | 7/2009 | Rosenblatt | H04N 5/2254 | 348/222.1 |
| 2009/0247237 A1* | 10/2009 | Mittleman | H04M 1/026 | 455/567 |
| 2009/0274336 A1* | 11/2009 | Infanti | H04R 1/2811 | 381/386 |
| 2009/0290744 A1* | 11/2009 | Wu | H04M 1/035 | 381/387 |
| 2010/0034415 A1* | 2/2010 | Tsao | H04R 1/2842 | 381/386 |
| 2010/0061055 A1* | 3/2010 | Dabov | G06F 1/1626 | 361/679.56 |
| 2011/0028191 A1* | 2/2011 | Huang | H01Q 1/243 | 455/575.7 |
| 2011/0261989 A1* | 10/2011 | Xiao | H04M 1/03 | 381/387 |
| 2012/0087065 A1* | 4/2012 | Kim | G06F 1/1656 | 361/679.01 |
| 2013/0328648 A1* | 12/2013 | Kuivallainen | H04B 1/38 | 335/219 |
| 2014/0056448 A1* | 2/2014 | Kuivalainen | H04R 1/023 | 381/189 |
| 2014/0198466 A1* | 7/2014 | Sawadski | H01Q 1/243 | 361/751 |
| 2014/0243052 A1* | 8/2014 | Hobson | H01Q 1/243 | 455/575.7 |
| 2014/0355812 A1* | 12/2014 | Tossavainen | H04R 1/02 | 381/395 |
| 2016/0227007 A1* | 8/2016 | Wang | H04M 1/03 | |

* cited by examiner

SPEAKER AND MOBILE COMMUNICATION TERMINAL DEVICE USING SAME

FIELD OF THE INVENTION

The present invention relates to communication technical field, particularly to a speaker and a mobile communication terminal device using the speaker.

DESCRIPTION OF RELATED ART

With the development of science and technology, and social progress, electronic products are more and more popular. The speaker, as an important part of electronic products, is used widely.

A traditional speaker comprises a housing and sounding element accommodated in the housing. The housing is usually made of plastic. The plastic housing is difficult to become thin and reduce thickness under the premise of ensuring strength. Therefore a steel strap is used to enhance the stiffness of the housing. The steel strap and plastic housing are molded together to increase the strength and reduce the thickness of the housing. But the result of this structure is that the steel strap and the magnetic circuit of the sounding element is prone to have static electricity, requiring grounding thereby. At the same time, the sounding element is required to connect to the electrical signal source and several circuit boards are used traditionally, such a speaker takes up too much space. Moreover the miniaturization trend of electronic products increases the difficulty degree of grounding, not only leads to high cost, but also often fails to realize grounding.

Therefore, it is necessary to provide an improved speaker to solve the problems of hard grounding and high cost, as mentioned above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Figure 1:
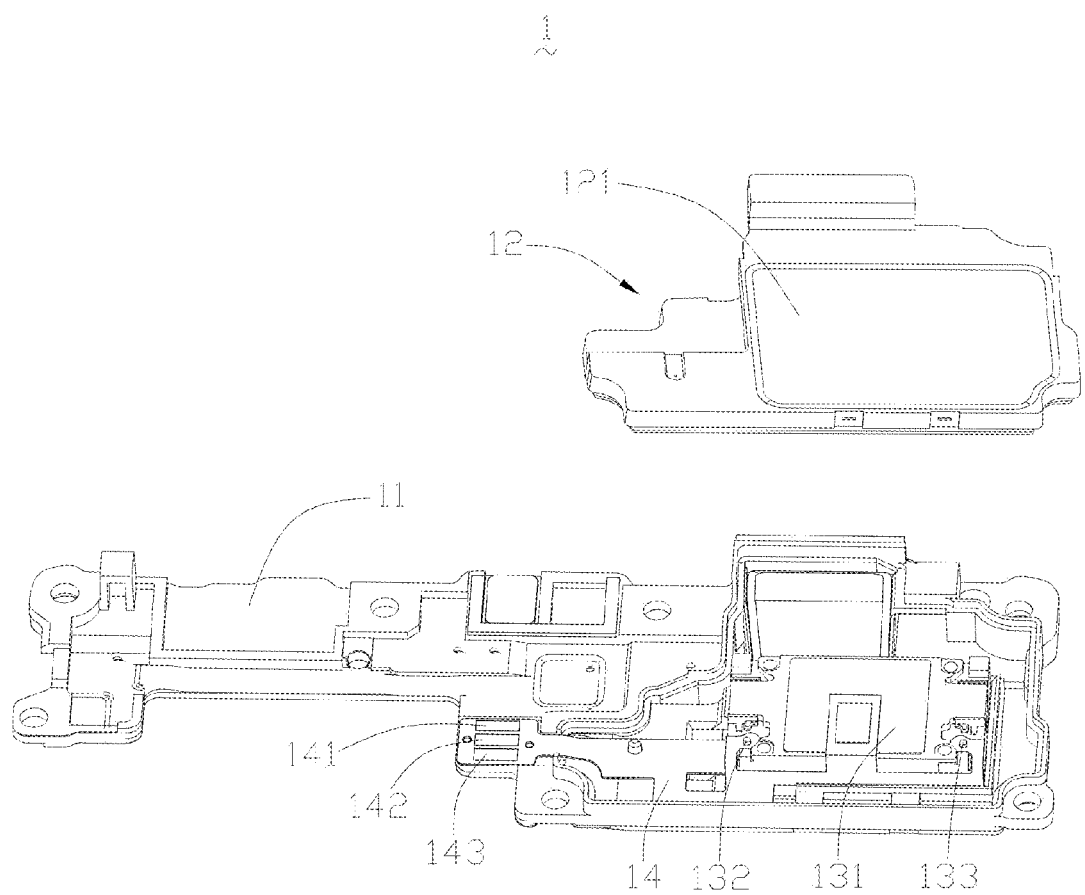
FIG. 1 is an isometric view of a speaker in accordance with an exemplary embodiment of the present disclosure.
Figure 2:
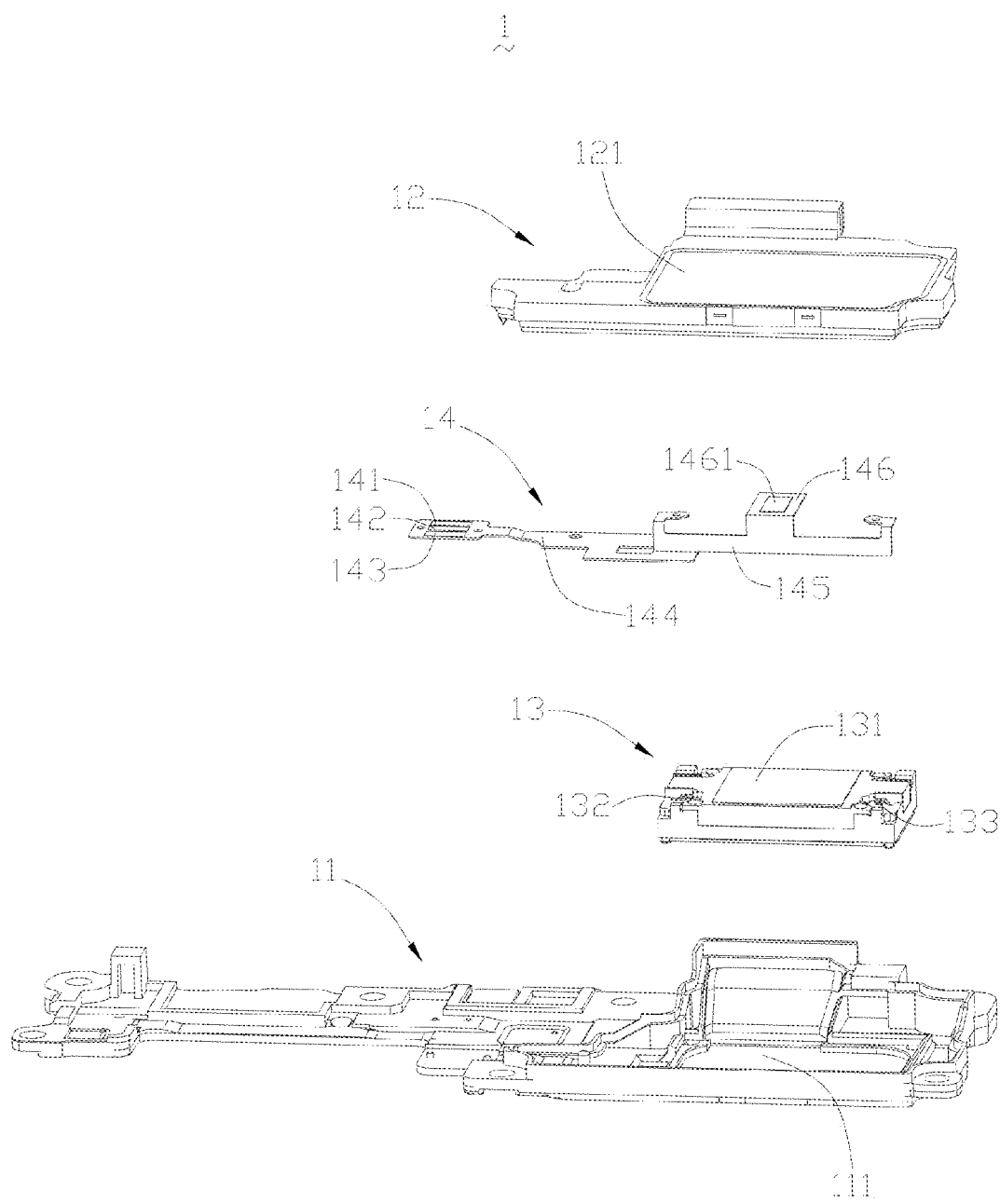
FIG. 2 is an exploded schematic view of the speaker in FIG. 1.
Figure 3:
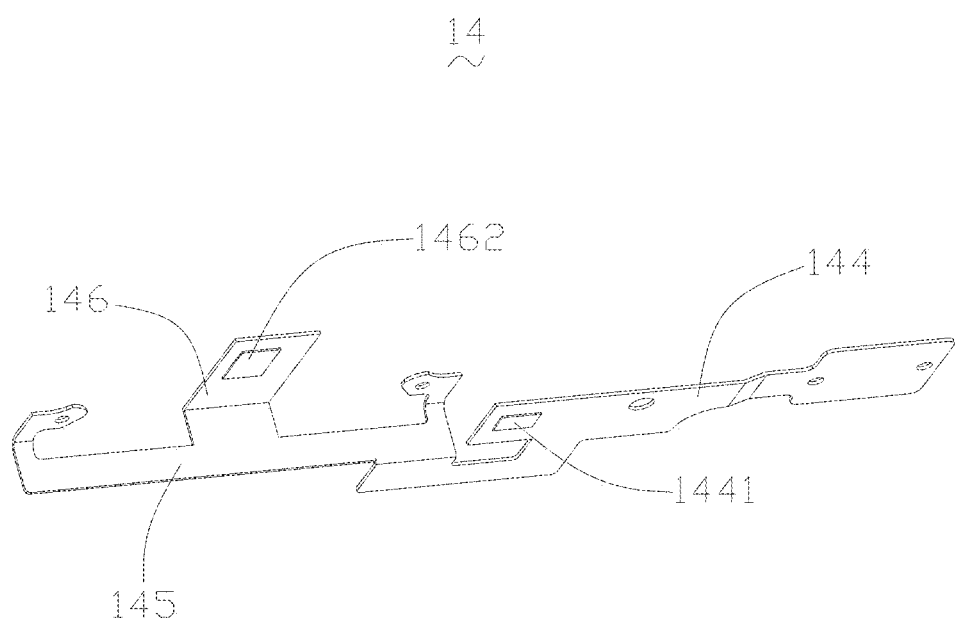
FIG. 3 is a structural schematic view of a flexible printed circuit board of the speaker in FIG. 1.

Please refer to FIGS. 1, 2 and 3. FIG. 1 is an isometric view of a speaker in accordance with an exemplary embodiment of the present disclosure; FIG. 2 is an exploded schematic view of the speaker in FIG. 1; and FIG. 3 is a structural schematic view of a flexible printed circuit board of the speaker in FIG. 1. The speaker 1 includes a first cover 11 and a second cover 12. The first cover 11 and the second cover 12 form a receiving space. The speaker 1 further includes a sounding element 13 and a flexible printed circuit board 14 located in the receiving space.

The first cover 11 and the second cover 12 are equipped respectively with a first steel strap 111 and a second steel strap 121 in an injection molding structure for reinforcing the strength. The sounding element 13 is located between the first steel strap 111 and the second steel strap 121.

The sounding element 13 includes a yoke 131, a positive terminal 132 and a negative terminal 133 for transmitting audio signals.

The flexible printed circuit board 14 is equipped with a grounding pin 141, a positive pin 142 and a negative pin 143 for transmitting audio signals. The ground pin 141 is respectively connected electrically with the first steel strap 111, the second steel strap 121 and the yoke 131 of the sounding element 13. The positive pin 142 and the negative pin 143 are electrically connected to the positive terminal 132 and the negative terminal 133 of the sounding element 13. Specifically, the flexible printed circuit board 14 comprises a first plate 144, a second plate 145 extending from the first plate 144, and a third plate 146 extending from the second plate 145. The ground pin 141, the positive pin 142 and negative pin 143 are located on the first plate 144. The first plate 144 is fixed on the first cover 11. The surface of the first cover 11 is provided with conductive adhesive 1441. The area of the conductive adhesive 1441 is a copper exposed area on the first plate 144. The first plate 144 is electrically connected to the first steel strap 111 by the conductive adhesive 1441. The second plate 145 is fixed by welding respectively with the positive terminal 132 and the negative terminal 133, to realize electrical connection. The third plate 146 is located between the sounding element 13 and the second cover 12. The surface of the second cover 12 is provided with a conductive foam 1461 and the opposite surface is provided with a conductive adhesive 1462. The areas of the conductive adhesive 1462 and the conductive adhesive 1462 are copper exposed areas on the third plate 146. The third plate 146 is electrically connected by the conductive adhesive 1462 to the bottom of the yoke 131 of the sounding element 13, thereby to realize electric conduction. After assembling, the conductive foam 1461 on the third plate 146 contacts the second steel strap 121 of the second cover 12, to realize electric conduction.

Certainly, the flexible printed circuit board 14 can be made into other shape. The specific shape shall be determined according to the internal structure of the speaker 1. The electric connection between the second plate 145 and the positive terminal 132 and the negative terminal 133 is not limited to the welding connection only. Other connection mode may also be used to achieve electrical connection, for example, wire connection. In this embodiment, the sounding element 13 is a yoke structure, for this reason, the third plate 146 is located at the bottom of the yoke 131 of the sounding element 13 to realize electric conduction. The sounding element 13 is a structure without yoke. The third plate 146 may be connected by the conductive adhesive 1462 with other part of the sounding element 13 to realize electric conduction.

The present disclosure discloses also a mobile communication terminal device, including a mainboard and the speaker 1. The mainboard is electrically connected to the flexible printed circuit board 14 of the speaker 1.

The speaker of the present disclosure is provided with a flexible printed circuit board. The flexible printed circuit board is equipped with grounding pin, positive pin and negative pin for transmitting audio signal. The positive pin and negative pin are electrically connected to the sounding element. The ground pin is respectively connected with the first steel strap, the second steel strap and sounding element. The board of the terminal device is electrically connected with the flexible printed circuit board, to realize the speaker grounding and audio signal transmitting. Therefore, in comparison to the existing technology, the speaker of the present disclosure, through a flexible printed circuit board, can realize that more components of the speaker are connected to ground and the positive and negative leads are connected outside. The speaker is not only simple in structure, but also has low cost.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A speaker including:
   a first cover and a second cover forming a receiving space;
   a first steel strap assembled with the first cover;
   a second steel strap assembled with the second cover;
   a sounding element accommodated in the receiving space and located between the first strap and the second strap, and having a yoke, a positive terminal and a negative terminal;
   a flexible printed circuit board accommodated in the receiving space, and including a first plate, a second plate extending from the first plate and a third plate extending from the second plate;
   the first plate having a grounding pin electrically connected with the first steel strap and the second steel strap and the yoke of the sounding element, a positive pin electrically connected with the positive terminal and a negative pin electrically connected with the negative terminal for transmitting an audio signal;
   the second plate fixed by welding respectively with the positive terminal and the negative terminal for realizing an electrical connection;
   wherein the third plate is located between the sounding element and the second cover, a conductive foam is provided on the third plate contacting the second steel strap, and an opposite surface is provided with a conductive adhesive for electrically connecting to the sounding element.

2. The speaker according to claim 1, wherein the first cover corresponding to the first plate is provided with conductive adhesive for electrically connecting to the first steel strap via the conductive adhesive.

3. The speaker according to claim 1, wherein the positive pin and the negative pin are electrically connected to the positive terminal and the negative terminal via the second plate of the flexible printed circuit board.

4. A mobile communication terminal device including a speaker as described in claim 1.

* * * * *